United States Patent [19]

Butler et al.

[11] Patent Number: 5,062,439

[45] Date of Patent: Nov. 5, 1991

[54] METHOD AND APPARATUS TO FACILITATE THE INJECTION OF SEALANT INTO A PRESSURIZED FLUID MEMBER

[75] Inventors: Johnny L. Butler, Highlands; Richard E. Wakeland, Houston; Donald R. Batson, Dayton; Robert E. Metzger, Baytown, all of Tex.

[73] Assignee: Spinsafe, Inc., Highlands, Tex.

[21] Appl. No.: 537,574

[22] Filed: Jun. 14, 1990

[51] Int. Cl.⁵ .................. F16K 43/00; F16K 41/02
[52] U.S. Cl. .................. 137/15; 29/402.01;
29/890.121; 137/315; 137/318; 228/2; 228/112;
228/119; 251/214; 277/72 FM
[58] Field of Search .............. 137/15, 237, 315, 318,
137/246.12, 246.22; 29/402.01, 890.121,
890.131, 890.148; 228/2, 112, 113, 114, 119;
277/72 FM; 251/214

[56] References Cited

U.S. PATENT DOCUMENTS

| | | | |
|---|---|---|---|
| 90,371 | 5/1869 | Lynch | 137/237 |
| 1,065,248 | 6/1913 | Hinman . | |
| 2,299,517 | 10/1942 | Volpin | 137/246.12 |
| 2,658,391 | 11/1953 | Grant | 137/237 |
| 2,795,039 | 6/1957 | Hutchins | 228/114 |
| 3,068,726 | 12/1962 | Nooy | 77/41 |
| 3,229,711 | 1/1966 | Leopold et al. | 137/318 |
| 3,347,261 | 10/1967 | Yancey | 137/315 |
| 3,568,299 | 3/1971 | Calton et al. | 228/113 |
| 3,905,718 | 9/1975 | Luckenbill et al. | 408/111 |
| 3,972,464 | 8/1976 | Codo et al. | 228/112 |
| 4,177,998 | 12/1979 | Laitkep et al. | 277/72 FM |
| 4,260,094 | 4/1981 | Stroo | 228/112 |
| 4,331,280 | 5/1982 | Terabayashi et al. | 228/112 |
| 4,350,052 | 9/1982 | Kendall | 73/863.86 |
| 4,648,422 | 3/1987 | Amblard | 137/318 |
| 4,711,013 | 12/1987 | Hannah et al. | 29/402.02 |
| 4,756,465 | 7/1988 | Pranch et al. | 228/112 |

OTHER PUBLICATIONS

Catalog Published by Ramforce Services Ltd., Old Mill Road, Avoch, Ross-shire, Scotland.
Seastud Catalog Published by Ramforce Services Ltd., Kirkhill Place, Kirkhill Ind Est., Aberdeen, Scotland.

Primary Examiner—George L. Walton
Attorney, Agent, or Firm—Arnold, White & Durkee

[57] ABSTRACT

A method and apparatus are provided for injecting sealant into a packing assembly chamber surrounding a valve stem 11 of a valve 2 without venting the pressure within the valve 2. A cylindrical body 60 is frictionally welded to the exterior of the valve 2 adjacent the packing assembly chamber. A drill bit is passed into the body 60 and through a set of packing seals 87. An opening is completed into the packing chamber. As the drill bit is withdrawn from the body 60, a second valve 70 is manually "closed" to isolate the packing chamber from the drill bit and prevent the escape of pressurized fluid when the drill bit is removed from the seals 87. Thereafter, a device for injecting sealant is attached to the body 60 and the valve 70 is "opened" to allow the sealant to flow into the packing chamber.

14 Claims, 3 Drawing Sheets

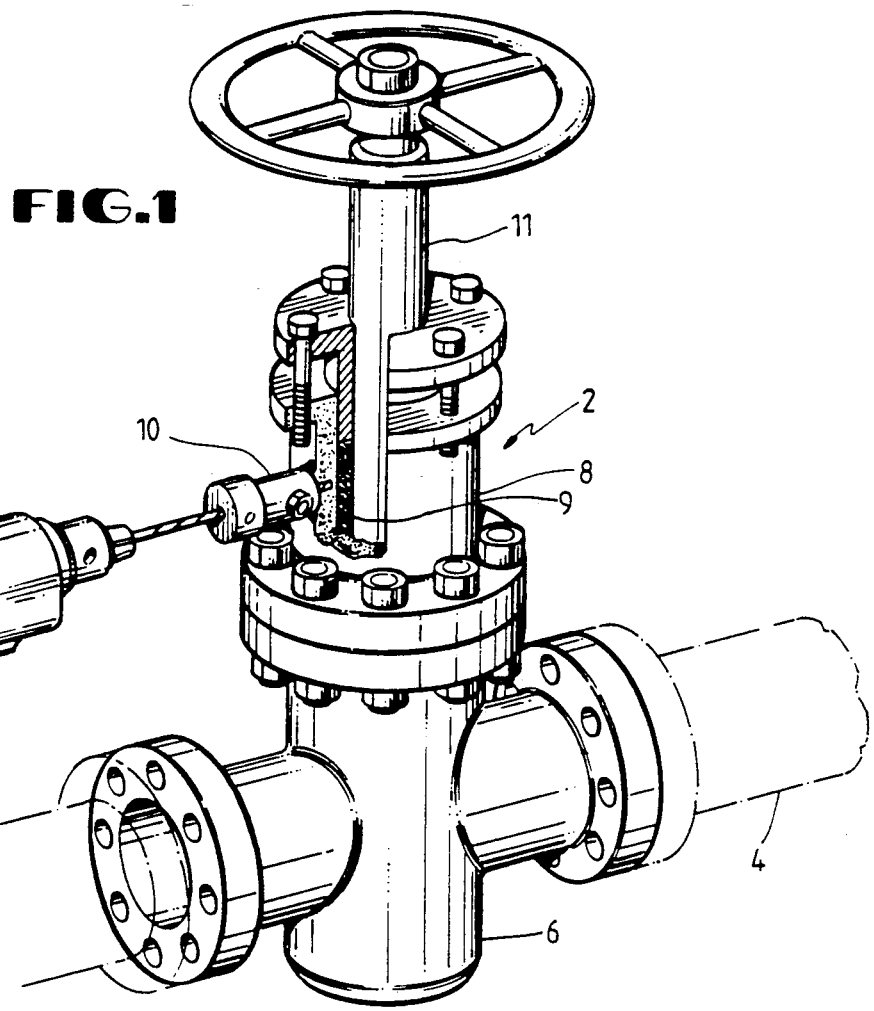
FIG.1
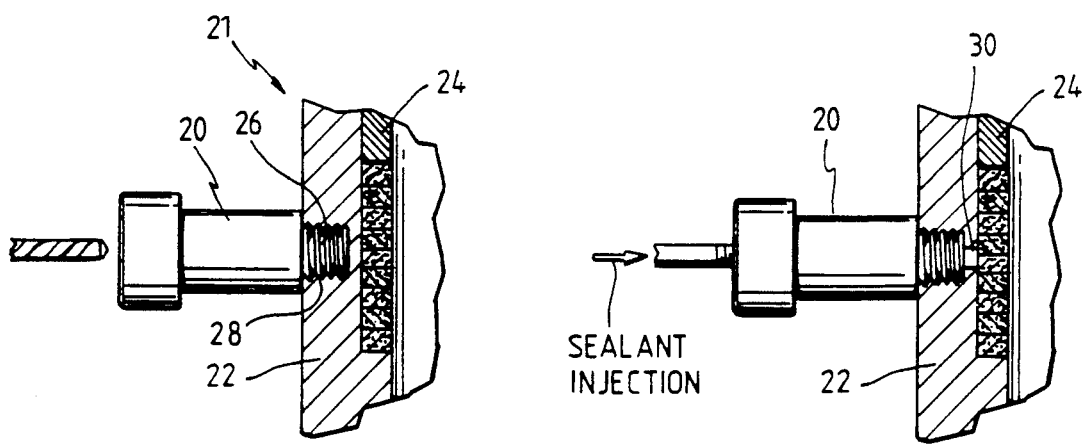
FIG.2A
(PRIOR ART)
FIG.2B
(PRIOR ART)

METHOD AND APPARATUS TO FACILITATE THE INJECTION OF SEALANT INTO A PRESSURIZED FLUID MEMBER

BACKGROUND OF THE INVENTION

1. Field of the Invention

The present invention is directed to a fitting adapted to be used to inject sealant into the packing of a pressurized fluid member so as to eliminate or substantially reduce leakage therethrough. More particularly, the present invention relates to a fitting adapted to be friction welded to a pressurized valve or pressure containing component, and a method for connecting said fitting.

2. Description of the Prior Art

The chemical, petroleum, petrochemical, and other heavy industries are often organized in large industrial complexes for the purposes of refining and/or processing a variety of gaseous and liquid products. Due to the nature of these products, such complexes are often characterized by the presence of many miles of conduit and piping which serve to convey such products throughout the industrial complex. The products carried by these pressurized pipelines may be highly corrosive, caustic, or toxic in nature. Alternatively, such products may be flammable or explosive, or otherwise hazardous should they be released into the environment.

Notwithstanding the environmental impact and other hazards which might result from the open, uncontrolled release of many of these chemicals, low grade releases or "leaks" are nevertheless fairly commonplace. Such releases often occur as a result of the failure of valving which is necessarily integrated into the aforedescribed pipeline network. Such failures usually occur when the valve packing deteriorates so as to allow fluid flow along the valve stem. Alternatively, failure occurs when the packing is compressed to the limits of the packing gland follower. Other leakages can be caused by seared or damaged valve seats which also allow leakage from the pressurized fluid member.

It is often possible to reduce or eliminate such packing failure by injecting a sealant into the packing cavity or valve seat area. Sealant may also be injected into valve or pipe clamps to reduce or substantially eliminate leakage along the seams of the clamp. The economics of the industrial complex, however, dictate that such repair measures be ordinarily carried out while the valve remains situated in a fully pressurized, operable line. As a result of such working environments, sealant injection into the valve must be carried out in a fashion so as to reduce the exposure to the technician as well as to prevent further and perhaps explosive leakage of possibly hazardous or toxic chemicals.

A number of techniques have thus been developed to enable sealant to be injected into a pressurized valve. One such technique involves the threaded attachment of a fitting to the exterior of the valve housing. In this technique, the attachment of such a fitting is accomplished by first drilling a pilot hole partway into the valve. This pilot hole is then threaded in a manner to accommodate the insertion of the threaded connector. Once the connector is secured to the valve housing, the hole in the valve housing is completed so as to allow the injection of sealant into the valve packing.

Disadvantages of such techniques include the possibility that the pilot hole will be accidentally completed through the pressure boundary of the valve. In the event of an accidental penetration of the valve housing, fluid carried by the valve is uncontrollably released through the pilot hole and into the environment. When this material is superheated, corrosive, or poisonous, even temporary exposure may result in a life threatening situation, both to the person attempting to complete the fitting, as well as to persons in the immediate area of valve itself. Further disadvantages with this technique include the creation of a connection which is considerably weaker than the original valve housing. In this connection, a weakened area is created in the valve housing which must be replaced at the earliest opportunity. Because of the restricted and temporary nature of such fittings, as well as the effort involved in their creation, such techniques are therefore relatively expensive.

As a result of the above disadvantages, other techniques and apparatus have been developed to inject sealant into a pressurized valve. One alternate technique involves the welding of a fitting to the exterior of the valve housing. Once the fitting has been welded to the exterior of the valve, a hole is then completed through the fitting into the valve packing whereupon sealant may then be introduced. Disadvantages, however, also exist with this technique. Such disadvantages include the inherent danger of using an open flame in areas where leakage is known to be present. If such leakage involves a flammable gas or liquid, a significant danger of fire or explosion is presented. Conventional welding also offers the potential for weakening of the pressure boundary of the valve due to metal thickness variations and the high heat necessarily generated during the normal weld process. Conventional welding techniques also create the possibility of hydrogen embrittlement, weld dilution, weld inclusion, and stress corrosion cracking. Furthermore, the time involved in the creation of a conventional weld may be significantly increased if surface preparation is required.

Further disadvantages of the traditional welded fitting include its restricted use to materials that do not decompose upon the addition of heat. Even where a flammable material is not directly introduced into the area surrounding the valve, a dangerous situation can nevertheless be presented if the valve controls the flow of materials such as acetylene, ethylene, or butadiene which do not require the presence of oxygen for flammable combustion, and may therefore decompose violently merely upon the addition of heat. Further, fittings welded with conventional techniques also result in the production of a weak area which must be removed and replaced at the earliest opportunity. Such techniques are therefore also relatively expensive in nature.

SUMMARY OF THE INVENTION

The present invention addresses the aforementioned and other disadvantages of prior art techniques and apparatus to accomplish the injection of sealant into a pressurized valve assembly.

The present invention is directed to an economical apparatus and method for injecting a sealant into the packing of a pressurized valve assembly where the completion of the fitting does not present many of dangers normally attendant to conventional fittings. In a preferred embodiment, the present invention comprises a generally cylindrical fitting having a longitudinal bore or drill guide formed therethrough and a tapered contact surface, where said fitting is provided with a removable driver cap capable of translating rotational movement and pressure to the fitting. In one embodiment, packing rings may be integrally situated in a stuffing box or the like formed in the body of the fitting so as to prevent the undesired passage of pressurized fluid from said valve through said bore. In other embodiments, a packing collar may be separately formed to attach to the distal end of the fitting once attachment to the valve housing has been completed.

The fitting of the present invention is adapted to be friction welded to the valve assembly or other pressure containing components. This is accomplished by positioning the fitting on a selected location on the pressurized component housing exterior to the packing and thereafter applying a desired rotational speed and pressure to the fitting until fusion occurs between the two members. Once the fitting is properly positioned, the driver cap is removed and, in instances where the packing is not formed integrally in the bore, a packing follower is threaded on the distal end of the fitting. Once the fitting is secured to the valve housing, a piercing apparatus such as a drill bit is then inserted through the packing collar and into the bore of the fitting whereupon an inlet hole is drilled through the friction weld but not through the pressure boundary. A hydrotest device may then be attached to the fitting in order to determine the integrity of the fitting. The bore is then completed into the valve and packing area. Once the sealant inlet is completed, a proper sealant may then be introduced into the valve packing.

The present invention has a number of advantages over the prior art. One such advantage is the relative safety provided by the present method in the presence of flammable or combustible fluids. This occurs due to the lack of an arc in a friction weld in addition to the significantly lower heat accompanying the creation of the weld itself. This lower heat allows the use of the present method in the presence of ethylene, acetylene, or other decomposing fuels. The creation of a friction weld also involves less time to complete than a threaded or conventionally welded fitting and therefore reduces the exposure time to the technician when valve failure has resulted in the creation of a hazardous or life threatening environment, e.g. such as is the case of $H_2S$ gas. The makeup time in a friction weld is further reduced by the virtual lack of surface preparation which is necessary to create the weld. Finally, the attachment of the present fitting results in the formation of a secure, integral portion of the valve to which it is affixed. No need is presented, therefore, to remove or replace the fitting. Due to the reusable nature of the fitting, therefore, overall costs of the fitting are reduced.

BRIEF DESCRIPTION OF THE DRAWINGS

The present invention has other features and advantages which will become more clearly apparent in conneciton with the following detailed description of a preferred embodiment, taken into conjunction with the appended drawings in which:

FIG. 1 illustrates a perspective view of the manner in which an injection inlet is produced in the valve housing.

FIGS. 2A-B illustrate cross-sectional views of a threaded, prior art fitting.

DETAILED DESCRIPTION OF THE DRAWINGS

Figure 3:
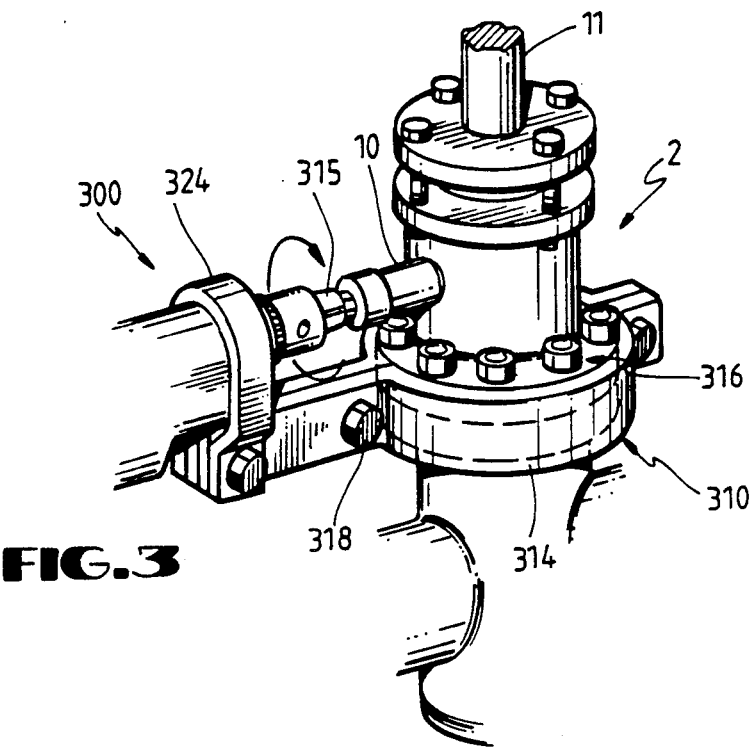
FIG. 3 illustrates a perspective view of the manner in which a fitting of the present invention is attached to a valve body.

The general application of a leakage valve fitting, including prior art fittings, may be seen by reference to FIG. 1. FIG. 1 illustrates a perspective, cutaway view of a conventional gate valve 2 disposed in a pressurized pipeline 4. Valve 2 generally comprises a valve body 6, a valve bonnet 8 and a valve stem 11. In FIG. 1, a pressurized fitting 10, in this case a fitting of the present invention, has been attached to the exterior of the valve bonnet 8 immediately opposite valve packing 9. As illustrated, a drill 1 is being used to complete the inlet through fitting 10 into valve packing 9.

FIGS. 2A-B illustrate the application of a conventional, threaded, fitting 20 to a valve possessing a failure of the valve packing. As illustrated in FIG. 2A, a pilot hole 28 has been formed in the valve housing 22 to a depth sufficient to accommodate the threaded attachment end 26 of fitting 20. When fitting 20 has been secured to housing 22, an injection inlet 30 is then completed through valve housing 22 via a drill 21 or the like. Once injection inlet 30 is completed, sealant may be injected through fitting 20 into the valve packing 24 via a sealant injection tool 27. (See FIG. 2B).

FIGS. 2A-B also illustrate the potential risk associated with the use of a threaded fitting. In order to form a secure attachment site to valve housing 22, pilot hole 28 must be formed to a substantial depth in said housing 22 so as to define a comparatively thin containment wall immediately adjacent valve packing 24. When the valve is positioned in a high pressure pipeline, this containment wall may fail during the creation of the fitting thereby placing the technician in a potentially life threatening situation. Alternatively, there also exists the risk that the pilot hole 28 may accidentally be completed through valve housing 22 so as to result in the inadvertent release of the high pressure liquid or gas carried by pipeline 4, thereby potentially exposing the technician to toxic or hazardous materials carried by the pipeline.

Figure 4:
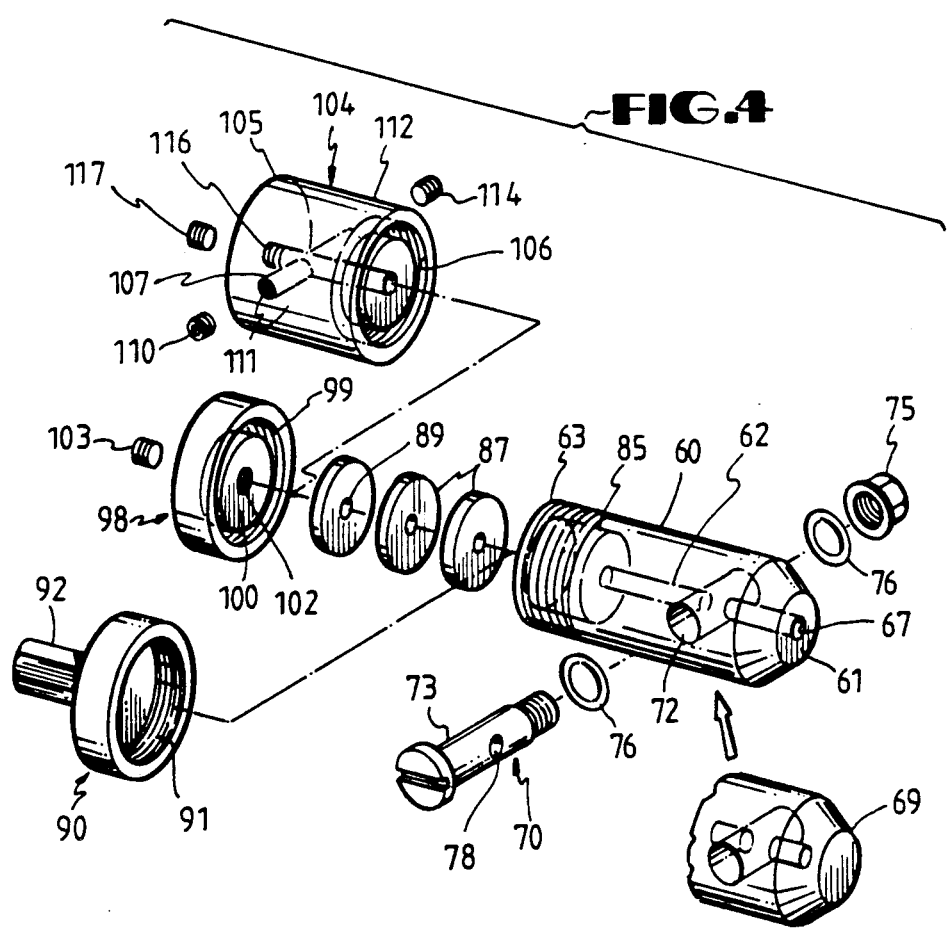
FIG. 4 illustrates an exploded, perspective view of one embodiment of the invention wherein the packing is integrated into the body of the fitting.
Figure 5:
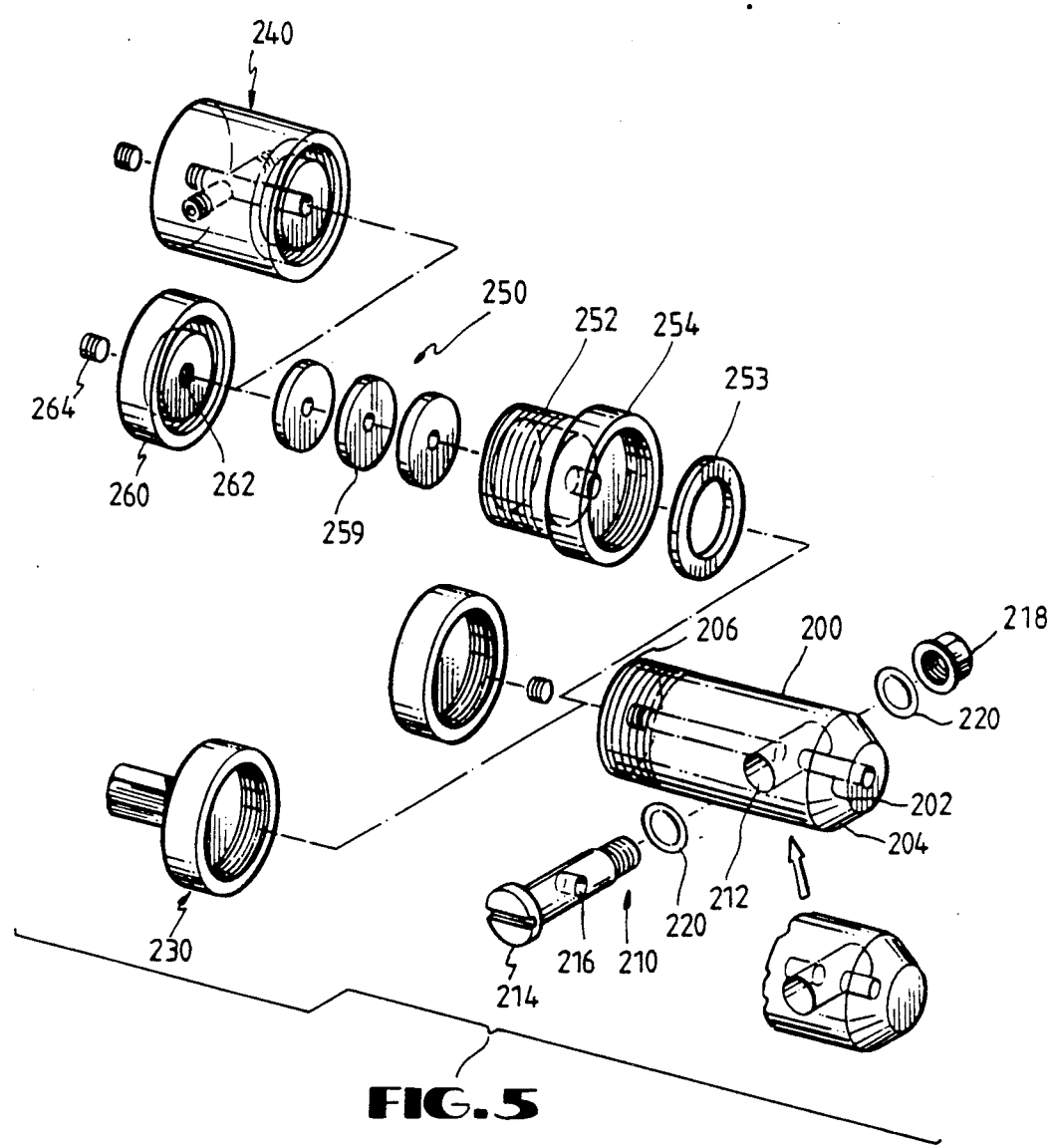
FIG. 5 illustrates an exploded, perspective view of a second embodiment of the invention where the packing is integrated into a separate packing assembly which is threadedly attached to the distal end of the fitting body.

A fitting of the present invention may generally be seen by reference to FIGS. 4 and 5. FIG. 4 illustrates an exploded, perspective view of one preferred embodiment of a fitting in which is shown a generally cylindrical body 60 through which is axially formed a bore or drill guide 62. Body 60 defines a proximal, attachment end 61 and a distal end 63. In some embodiments, drill guide 62 may be completed through proximal end 61 so as to define an aperture designated 67. In other embodiments, drill guide 62 may terminate in body 60 such as to form a solid attachment head 69. The use of a solid attachment head 69 may be desirable when the fitting is used with certain high grade alloyed metals.

In the embodiment illustrated in FIG. 4, drill guide 62 intersects and establishes fluid communication with a transversely disposed stem valve 70. Stem valve 70 is generally comprised of a cylindrical bore 72 adapted to rotatably receive a valve pin 73 where pin 73 may be secured via a self locking fastener 75 and sealing elements 76. Valve pin 73 is itself provided with a transversely disposed bore 78 which is formed in pin 73 such that pin 73, when properly situated in bore 72, allows fluid flow through bore 62 when rotated to an "open" position. Conversely, valve 70 constricts fluid flow through drill guide 62 when aligned in a "closed" position. Preferably bore 78 is at least of an equal diameter to drill guide 62 so as to allow for the introduction and movement of an appropriately sized drill bit as will be further discussed herein.

In the embodiment illustrated in FIG. 4, the distal end 63 of body 60 is provided with a larger diameter bore or stuffing box 85. Stuffing box 85 is disposed in body 60 such as generally to define a continuation of bore 62. Box 85 is adapted to receive one or more packing rings 87 as shown. In a preferred embodiment, packing rings 87 are provided with axially disposed apertures 89 therethrough. Apertures 89 are preferably of a smaller diameter than drill guide 62 so as to enhance the sealing performance of packing rings 87 about the drill bit in the event pressurized fluid is released through guide 62 during the completion of the sealant injection site.

In a preferred embodiment, body 60 may alternately receive a driver cap 90, packing follower 98, or packing ring gauge assembly 104. Body 60 is therefore preferably threaded about its distal end 63 although other means to join or couple these components is envisioned within the spirit of the present invention. Driver cap 90 is adapted for use during the fabrication of the friction weld, and is generally comprised of a body 91 and a driver stud 92. Stud 92 is preferably hexagonal in shape so as to be operatively formed about the compatible with a friction welder such as a SEASTUD portable friction welding device, as manufactured by Ramforce Ltd. of 1 Shields Cres, Booragoon, West Australia.

Upon the completion of the friction weld, driver cap 90 is removed from body 60. Packing rings 87 are then inserted in box 85 if formed integrally in body 60. Packing rings 87 are compresively held in box 85 by a follower 98 which generally includes a tubular body 99 which is threaded about its proximate, open end. Follower 98 includes an inwardly protruding compressive element 100 as shown. Follower 98 is provided with an axially disposed aperture 102 which corresponds with drill guide 62 so as to allow for the insertion of a drill bit therethrough. In such a fashion, an insertion inlet may be completed through the assembly comprising the body 60 and follower 98. Preferably, aperture 102 is threadedly receivable to a plug 103 and an O-ring or other appropriate sealing element (not shown).

In some applications, it may be necessary to gauge the pressure at the valve stem or otherwise provide the fitting with a means to vent pressure from the valve. In such occasions, a packing gauge assembly 104 may be coupled to the fitting body 60. As illustrated in FIG. 4, packing gauge assembly 104 generally comprises a cylindrical body 105 provided with a axially disposed internal bore 108. Bore 108 is preferably of a diameter sufficient to allow the introduction of an appropriately sized drill bit or the like. A second bore 107 is transversely disposed in body 105 so as to intersect and establish fluid communication with bore 108. Bore 107 defines two radially aligned apertures 111 and 112 about the exterior of body 105. Apertures 111 and 112 formed may be threaded so as to accommodate a pressure gauge 110 or a relief valve 114 of generally conventional design. Alternately, apertures 111 and 112 may accommodate one or more sealing plugs. The aperture 116 defined in the distal end of body 105 by bore 108 may likewise receive a gauge, valve or plug 117 (as illustrated).

A second embodiment of the invention may be seen by reference to FIG. 5. FIG. 5 illustrates many of the features of the embodiment illustrated in FIG. 4 including a body 200 provided with a drill guide 202, where body 200 defines a proximal attachment end 204 and a distal end 206. As previously disclosed in conjunction with the embodiment of FIG. 4, body 200 may also be provided with a stem valve 210 comprising a transverse, intersecting bore 212 receptive to a valve pin 214 securable in bore 212 via a self locking fastener 218 and sealing elements 220. Pin 214 is provided with a transverse bore 216 which is adapted to allow fluid flow through drill guide 202 when aligned in an "open" position. The fitting illustrated in FIG. 5 likewise accommodates a driver cap 230 and packing gauge assembly 240 as earlier described.

Unlike the embodiment illustrated in FIG. 4, the embodiment of FIG. 5 is provided with a separate and detachable packing assembly 250. Assembly 250 generally comprises a body 252 having a proximal attachment flange 254 threadedly attachable to the distal end 206 of body 200. To enhance sealing between packing assembly 250 and body 200, a sealing element 253 may be provided. Body 252 defines a bore therethrough of sufficient diameter to receive one or more packing rings 259 where said rings 259 are preferably provided with an axially aligned aperture so as to permit the insertion of an appropriately sized drill bit or the like. Assembly 250 also includes a follower 260 which is threadedly attachable to the distal end of body 252. As with the embodiment of FIG. 4, follower 260 is also preferably provided with axially aligned aperture 262 which is sealable via a cap or plug 264.

The use of the present invention may generally be described as follows by reference to FIGS. 1–6. In a valve determined to possess a failure of, or the leakage along, the valve packing, an attachment site is chosen on the exterior of the valve housing. Once an appropriate site is determined, a portable friction welding apparatus 300, such as a SEASTUD portable friction welding apparatus, is secured in place to the exterior of the valve housing 2 via an attachment clamp 310 or the like as illustrated in FIG. 3. Attachment clamp 310 may comprise a pair of brackets 314 and 324 securable below the valve bonnet 316 via appropriate fasteners 318 or the like. (See FIG. 3). This rotational speed and contact pressure is preferably transmitted to the fitting via driver cap 90 (FIG. 4) which accommodates a hexagonal socket attachment 315 coupled to friction welder 300. The friction welding apparatus 300 must be capable of providing sufficient rotational speed to the fitting so as to induce the junction between the fitting and the housing to become plastic and flow away from the point of contact while at the same time removing any surface contaminants. Generally, rotational speed in the order of 25,000–30,000 rpm are required. When this interface has been achieved, an axial load is applied thereby allowing the components to fuse together.

The rotational speed and pressure necessary to fashion a secure friction weld will vary depending on the materials comprising the fitting and the valve housing, as well as the size of the fitting employed. In this connection, it is contemplated that a higher rotational speeds to achieve a more plastic condition will be necessary in the absence of a high contact pressure. Conversely, greater contact pressure will allow for the use of a lower rotational speed.

Figure 6:
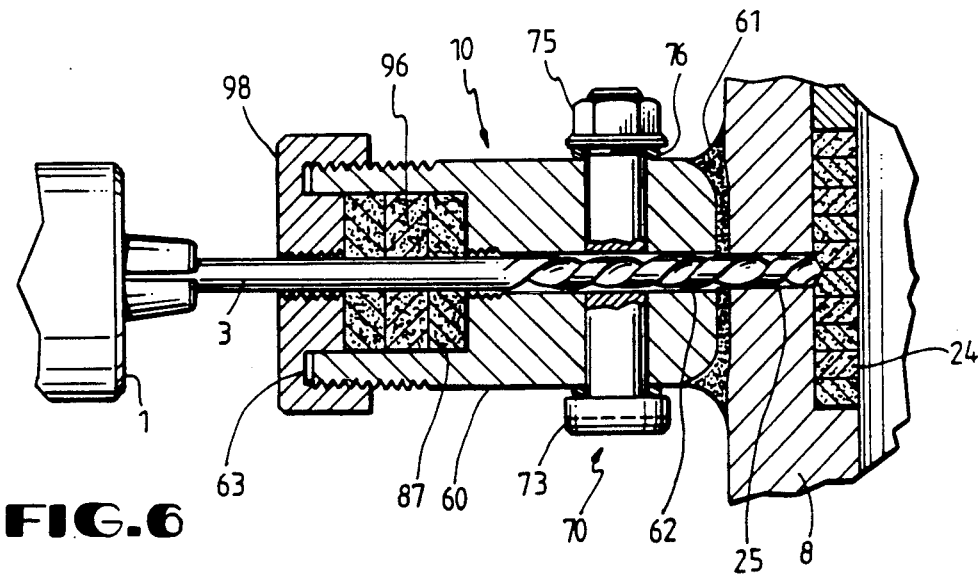
FIG. 6 illustrates a cross-sectional view of one embodiment of the invention as it may be applied to a valve housing.

Referring to FIG. 6, once fitting 10 has been secured to the exterior of the valve housing, driver cap 90 is removed and replaced with a packing assembly 96 and follower 98 as previously described in relation to FIG. 4. At this time also, stem valve 70 is assembled and moved to an "open" position. A drill bit 3 of generally conventional design is then inserted through packing assembly 96 and drill guide 62 into contact with the valve housing, whereupon a sealant inlet or bore 25 is then completed through the valve housing 8 and into the valve packing 24. In some embodiments, completion of inlet bore 25 will first involve the completion of the drill guide through the attachment end of the fitting body. Also, in some cases it may be desired to subject the friction weld 61 to a hydrostatic test preliminary to the completion of bore 25. Such a hydrostatic test may be desirable in order to verify the integrity of the pressure boundary formed by weld 61.

Upon completion of bore 25, resident pressure in valve 2 will tend to force fluid through drill guide 62 around bit 3. This fluid flow is substantially prevented by the close tolerance fit of packing rings 87 about drill bit 3. When fluid communication has been established between fitting 10 and the valve packing 24, the drill bit is withdrawn to a position anterior to stem valve 70 which is then moved to a "closed" position, thereby preventing fluid flow through drill guide 62. The drill bit is then completely removed from the fitting 10.

A conventional sealant injection tool is then threadedly coupled to the fitting 10 so as to introduce sealant through drill guide 25 into packing 24 in a manner similar to that shown in association with FIG. 2B. Once in position, stem valve 70 is then moved to an "open" position whereupon sealant is injected into the valve packing 24. Once the injection of sealant has been completed, stem valve 70 is again moved to a "closed" position whereupon drill guide 62 may be sealed via plug 103. Alternately, a packing gauge assembly 104 may be secured to fitting 10 so as to allow pressure monitoring and venting as earlier described.

What is claimed is:

1. An apparatus for introducing sealant into the packing of a pressurized body, said apparatus comprising:
   a housing;
   a first valve contained within said housing and adapted for operation via manipulation of a valve stem extending through said housing;
   a packing assembly forming a chamber around said valve stem;
   a body having a first bore formed therethrough and a seal positioned in said bore and adapted to engage a boring means inserted into said first bore to impede fluid flow around said boring means and through said first bore, said body having a contact end and a second end, the contact end of said body being adapted to be friction welded to the exterior of the housing adjacent said packing assembly, the second end of said body receivable to a driver cap which is cooperative with a means to produce rapid rotational movement thereof, which movement of said driver cap is translated to the contact end of said body to induce frictional welding between said body and the exterior of said housing;
   a second valve located in said body intermediate said seal and said contact end and adapted for operation between a first position for blocking fluid flow through said first bore and a second position in which the first bore is substantially open to fluid flow therethrough, said second valve being adapted for receiving said boring means therethrough in said second position for boring a hole through said housing and opening into said packing assembly chamber;
   means attachable to said second end of said body for injecting sealant into said packing assembly chamber after said boring means has been removed and said second valve is in said second position, thereby preventing leakage of fluid from within said valve housing along said valve stem.

2. The fitting of claim 1 wherein said first bore defines a guide for a drill bit.

3. The fitting of claim 1 wherein said bore is formed only partially through the body.

4. The fitting of claim 1 wherein the contact end is tapered.

5. The fitting of claim 1 wherein the seal comprises packing rings.

6. A method of injecting a sealant into a chamber formed by a packing assembly of a first valve, comprising the steps of:
   attaching a driver cap to a first end portion of a fitting:
   rotating said driver cap and fitting at high speed to friction weld a second end portion of the fitting to the exterior of the first valve at an area immediately adjacent the packing assembly chamber;
   removing the driver cap from the fitting:
   inserting a packing seal into a bore extending into the second end portion of said fitting;
   opening a second valve operatively positioned in said fitting bore between said seal and said first end portion;
   inserting a boring means through the packing seal, into the bore of said fitting, and through said opened second valve;
   completing a bore hole into the packing assembly chamber of said first valve so as to establish fluid communication between the fitting bore and said packing assembly chamber;
   withdrawing the boring means a preselected distance along said fitting bore to remove said boring means from said second valve while maintaining contact between said boring means and said packing seal;
   closing the second valve in said fitting bore to interrupt fluid communication between said packing assembly chamber and said fitting bore;
   removing said boring means from said fitting bore;
   coupling to the second end of said fitting means for injecting sealant into the packing assembly chamber of said first valve;
   opening said second valve to establish fluid communication between said packing assembly chamber and said sealant injecting means;
   injecting sealant into the packing assembly chamber of said first valve; and
   closing said second valve to interrupt fluid communication between said packing assembly chamber and said sealant injecting means.

7. A fitting adapted to be attached to the exterior of a valve to enable the introduction of sealant into a chamber formed by a packing assembly of said valve, comprising:

an elongated body defining a bore extending longitudinally therethrough, said body having an attachment end and a distal end, said attachment end being adapted to be friction welded to the exterior of said valve adjacent said packing assembly chamber, said distal end being adapted to accommodate means to impart rotation of said body and friction weld said body to said valve, said bore having a larger diameter adjacent the distal end so as to form a stuffing box adapted for receiving a seal therein, said bore being adapted for receiving boring means inserted therethrough in sealing contact with said seal;

a second valve coupled to said body and positioned in said bore intermediate said stuffing box and said attachment end, said second valve being adapted for movement between an open and closed position for respectively permitting and inhibiting fluid communication between said distal and said attachment ends of said body, said second valve being adapted for receiving said boring means therethrough in said open position, whereby the boring means may be inserted through said attachment end and said second valve and into said packing assembly chamber to provide an opening therein;

means attachable to said distal end of said body for injecting sealant into said packing assembly chamber after said boring means has been removed and said second valve is in said open position, thereby preventing leakage of fluid from within said valve housing along said valve stem.

8. The fitting of claim 7 wherein the attachment end is tapered.

9. The fitting of claim 7 wherein the bore opens onto said distal end and terminates within said attachment end.

10. The fitting of claim 7 wherein said distal end is receivable to a means to measure pressure within said bore.

11. The fitting of claim 7 wherein said distal end is provided with a means to vent pressure from said bore.

12. A fitting adapted to allow the introduction of a sealing compound into a chamber formed within a body of a first valve between a pair of moveable substantially sealing surfaces of said first valve, said sealing compound being introduced into said chamber while maintaining containment of fluid carried by said first valve, comprising:

a body having a contact end and a second end, said body provided with a first longitudinal bore disposed therethrough and opening onto said second end and being adapted for receiving a boring means inserted therethrough, said second end being adapted to receive a removable driver cap which is adapted to communicate rotational movement from a rotation means to said body to induce frictional welding between the contact end of said fitting and said valve body adjacent said chamber;

the second end of said fitting also defining a second larger diameter, longitudinal bore which communicates with said first bore, and is adapted to receive a seal adapted to interact with said boring means and impede longitudinal flow past said boring means and through said bore;

a second valve positioned within said body and adapted for movement between an open and closed position to respectively permit and inhibit flow through said first bore, said second valve being adapted to receive said boring means therethrough when configured in said open position and permit said boring means to form an opening into said chamber; and means attachable to said second end of said body for injecting sealant into said chamber after said boring means has been removed and said second valve is in said open position, thereby preventing leakage of fluid through said chamber.

13. The fitting of claim 12 wherein said seal includes at least one packing ring.

14. The fitting of claim 12 wherein the second end of said body is adapted to receive means for measuring fluid pressure within said first bore.

* * * * *

UNITED STATES PATENT AND TRADEMARK OFFICE
CERTIFICATE OF CORRECTION

PATENT NO.   : 5,062,439
DATED        : November 5, 1991
INVENTOR(S)  : Johnny L. Butler et al.

It is certified that error appears in the above—identified patent and that said Letters Patent is hereby corrected as shown below:

Column 2, line 62, before "dangers" insert --the--.

Column 5, line 34, delete "about the" and insert --and--.

Signed and Sealed this

Ninth Day of March, 1993

Attest:

STEPHEN G. KUNIN

Attesting Officer    Acting Commissioner of Patents and Trademarks